Sept. 8, 1942.  J. A. CANN  2,295,258
APPARATUS FOR AGITATING AND DISTRIBUTING LIQUIDS
Filed May 23, 1941  2 Sheets-Sheet 1

INVENTOR
J. A. Cann
BY
Edwards, Lower Poor
ATTORNEY

Sept. 8, 1942.  J. A. CANN  2,295,258
APPARATUS FOR AGITATING AND DISTRIBUTING LIQUIDS
Filed May 23, 1941  2 Sheets-Sheet 2

INVENTOR
John Arthur Cann
BY
Edwards, Bower & Tool
ATTORNEYS

Patented Sept. 8, 1942

2,295,258

UNITED STATES PATENT OFFICE 2,295,258

APPARATUS FOR AGITATING AND DISTRIBUTING LIQUIDS

John Arthur Cann, Bickley, England, assignor to Turner & Newall Limited, Spotland, Rochdale, England, a British company Application May 23, 1941, Serial No. 394,906
In Great Britain May 27, 1940

7 Claims. (Cl. 259—168)

This invention relates to apparatus for agitating and distributing liquids.

A need exists for an apparatus for forming an even, thin layer of an aqueous asbestos-cement mixture of creamy consistency, and at the same time acting as a reservoir for the mixture when the layer formation must be stopped and maintaining the mixture uniform by agitation. The principal object of the invention is to provide an apparatus for this purpose. The invention also aims at providing apparatus which may be used to agitate and distribute other liquids at a constant rate, particularly if it is necessary to interrupt the delivery from time to time.

A further object of the invention is to provide an improved form of agitating container capable of acting also as a reservoir.

Yet another object of the invention is to provide means for distributing laterally and forming into a uniform stream liquid supplied through a pipe or the like.

A still further object of the invention is to provide an improved container for receiving and distributing liquid, and for returning to the source of supply excess liquid delivered to it.

My invention will best be understood by reference to the following description of the preferred embodiment, when read in conjunction with the accompanying drawings, in which.

Figure 1:
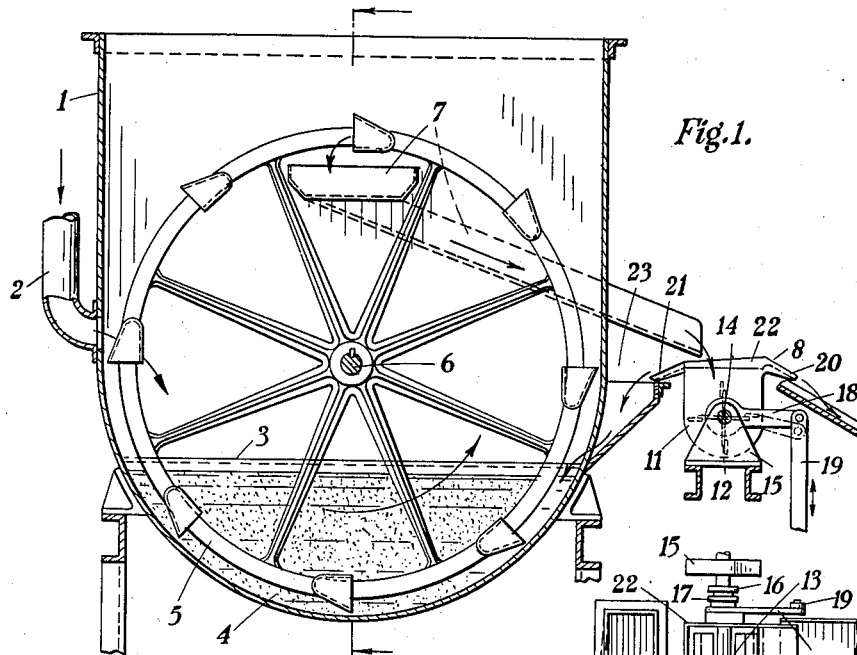
Figure 1 is a side elevation and Figure 2 a plan of the apparatus.
Figure 2:
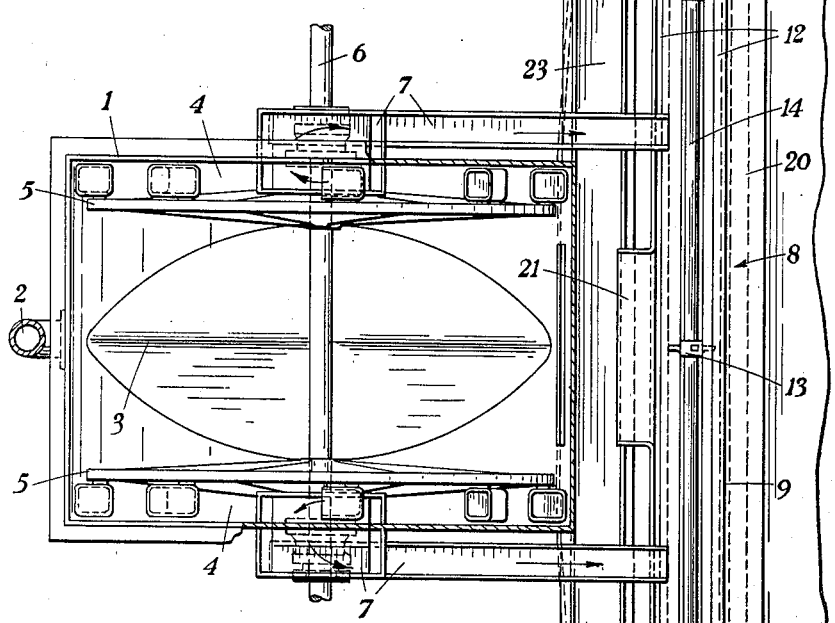
Figure 3:
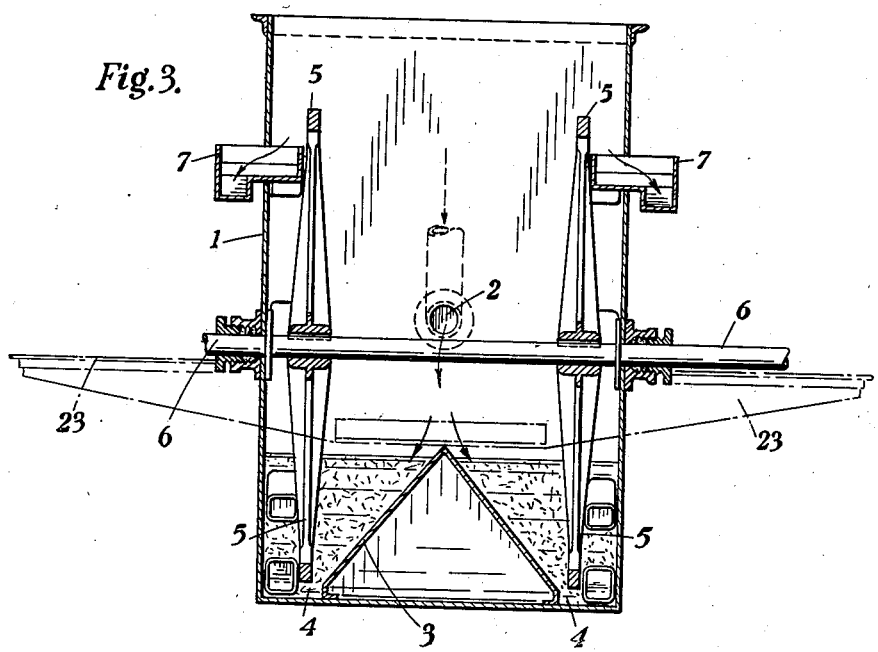
Figure 3 is a cross-section through the agitating container.
Figure 4:
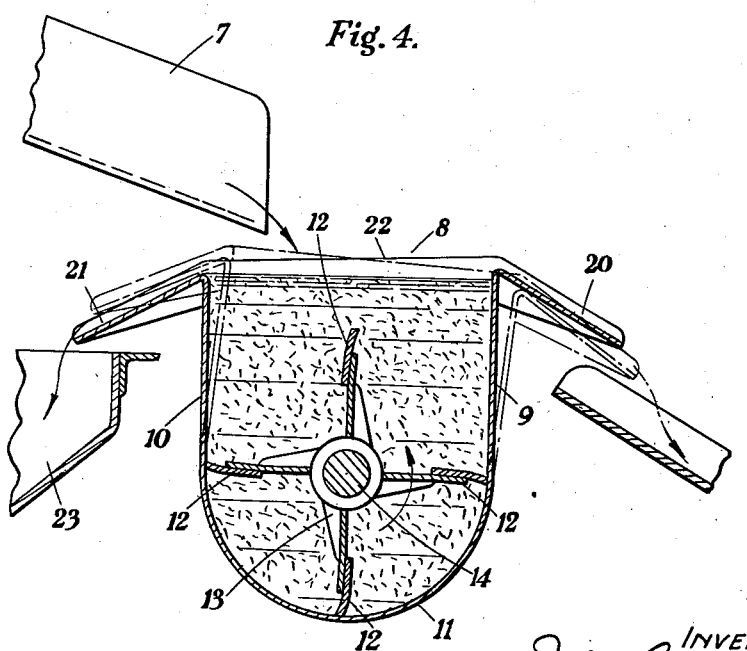
Figure 4 is a cross-section through the distributing container, on a larger scale.

The apparatus is intended to receive and distribute an aqueous asbestos-cement mixture. This mixture is supplied to an agitating container 1 in a narrow stream through an inlet 2. The container has a bottom which has a central crest formed by a dividing plate 3, so that there are two troughs 4, one on each side. Two bucket-wheels 5, forming agitating and elevating means, are carried on a horizontal shaft 6, one working in each trough 4. The liquid is delivered onto the top of the plate 3, runs down its sides, and is elevated by the bucket wheels 5 to troughs 7, down which it runs to a distributing container.

This distributing container, shown at 8, has two parallel sides 9 and 10 and a semi-cylindrical bottom 11. The front or delivery side 9 is deeper than the other side 10. An agitator in the form of blades 12 carried by radial arms 13 on a horizontal shaft 14 is mounted inside the container. The shaft extends out at each end of the container into bearings 15, and leakage is prevented by glands 16 which enter tubular sockets 17 that are fixed to the container and surround the shaft. The shaft is rotated, and as it rotates the blades 12 sweep closely over the bottom 11 of the container. The container 8 is mounted to rock as a whole about the axis of the shaft 14, and it is rocked by lever systems provided at each end and each comprising a rocker arm 18, one end of which is fixed to the tubular socket 17. The other end of each rocker arm 18 is pivoted to a rod 19, the two rods 19 being interconnected to rock the container 8.

The tops of the sides 9 and 10 form weirs, and are provided with outwardly extending pouring lips 20 and 21 respectively. The lip 20 extends over the whole length of the container, but the lip 21 extends only over the central part of the container. The ends of the container are provided with upstanding flanges 22 to prevent liquid escaping.

When the container 8 is in such a position that the walls 9 and 10 are both vertical, the top of the wall 9 is higher than that of the wall 10. Liquid is delivered through the troughs 7 in excess and flows out from the container 8 over the lip 20 in a uniform stream, excess liquid flowing back over the top of the weir formed by the narrower lip 21. This excess liquid then flows down the lip 21 into a trough 23 arranged parallel to the axes of both containers and thence back into the agitating container 1. If the delivery must be stopped altogether, the container 8 is rocked anti-clockwise until the wall 9 is so much higher than the wall 10 that all the liquid is returned.

It will be seen that the apparatus described incorporates a number of advantageous features. By lifting the liquid, the bucket wheels give it a sufficient head for any excess to return under gravity. As excess liquid is returned, the agitating container acts as a reservoir. Moreover, it is usually convenient to supply the liquid to the agitating container in a narrow stream, and by using two or more bucket wheels or the like some lateral distribution of the liquid is effected before the distributing container is reached.

By making the bottom of the agitating container with at least one crest and at least two troughs, it is ensured that all the liquid entering the container rapidly arrives at a point where it is agitated, and none is allowed to remain in the container for any length of time. At the same time, if for any reason the discharge of liquid must be stopped for some time and the supply is not also stopped, the container can act as a reservoir.

As the distributing container is mounted to rock, the flow of liquid over the weir means formed respectively by the front and rear edges of the distributing container can easily be controlled. At the same time, the liquid may be supplied to the apparatus continuously and there may be intermittent interruptions in the delivery. This is highly desirable, as in making asbestos-cement products the wet asbestos-cement mixture must be formed continuously for practical reasons, but the continuous conveyor web that forms part of the machines most commonly used must be stopped periodically whenever one product has been formed and must be taken out of the machine and the production of another product must be started.

I claim:

1. In an apparatus for distributing a liquid, in combination, a liquid agitating container with imperforate side walls and bottom receiving the liquid and retaining it for agitation, a liquid distributing container comprising an elongated trough-like receptacle having side and bottom surfaces formed to hold the mass of the agitated liquid and to receive the inflow of said agitated liquid at a part of said mass and discharge the outflow thereof from another part of the mass at a side of said distributing container, means for supplying liquid in a narrow stream to said agitating container, means for delivering said liquid from said agitating container in a plurality of separate streams to elevated points above said distributing container, means permitting said streams to flow by gravity separately from said elevated points to said distributing container, weir means at the delivery side of said distributing container for discharging said liquid in a uniformly spread stream therefrom, a conduit for returning by gravity to said agitating container excess of said liquid delivered by said delivery means.

2. Apparatus as set forth in claim 1 in which said means for returning liquid to said agitating container comprises a weir having its level relatively adjustable with respect to the level of said discharge weir.

3. A system for agitating and distributing a liquid suspended mixture comprising means providing the liquid as a liquid suspension of creamy consistency, a liquid container with imperforate side walls and bottom receiving the liquid suspended mixture and retaining it for agitation, means in said container for agitating said liquid suspended mixture while maintaining its consistency and composition and removing successive increments having said consistency and composition and carrying said increments upward to an elevated delivery above the level of the liquid mixture in the container, a liquid agitating and distributing container having side and bottom surfaces formed to retain a mass of the agitated liquid and comprising a receptacle having an extended weir formation for the discharge of said liquid suspended mixture as an even thin layer of creamy consistency, means flowing said liquid suspension from said elevated point to said agitating distributing container so that the liquid suspended mixture is maintained in agitated condition and of constant consistency and composition throughout the containers and the supply of the suspended mixture is transformed into a thin horizontal layer at the delivery end.

4. A system as set forth in claim 3 in which the agitating and elevating means comprises a plurality of bucket means mounted to rotate in said agitating container and operated to pick up said increments of the liquid mixture therein and discharge it at elevated points above said agitating and distributing container.

5. A system as set forth in claim 3 in which the containers are supplied with a connecting return flow means for return of the excess of liquid delivered from said agitating container to said agitating and distributing container, the latter container having a weir forming a part of said return flow means.

6. A system as set forth in claim 3 in which the said containers are provided between them with return flow means for the excess of liquid delivered to the agitating and distributing container and said distributing container is tipped around a substantially horizontal axis to control the delivery over the discharge weir and the amount of the return to the agitating container.

7. In an apparatus for distributing a liquid, in combination, a liquid-agitating container receiving a liquid and retaining it for agitation, a liquid distributing container mounted to rock about a horizontal axis, discharge weir means in said distributing container and movable therewith, return weir means in said distributing container, said discharge and return weir means being formed respectively by front and rear edges of said distributing container so that said discharge weir means is raised when said distributing container is rocked to lower said return weir means and vice versa, means for delivering said liquid from said agitating container to an elevated point above said distributing container, means permitting said liquid to flow by gravity from said elevated point to said distributing container, means for returning by gravity to said agitating container said liquid flowing over said return weir means and means for rocking said distributing container to control the flow of liquid over said respective weir means.

JOHN ARTHUR CANN.